(12) United States Patent
McCue et al.

(10) Patent No.: US 6,513,817 B2
(45) Date of Patent: Feb. 4, 2003

(54) SHOPPING CART HAVING A CHILD SUPPORTING APPARATUS

(75) Inventors: David S. McCue, Manchester, MA (US); Christopher R. Hickey, Auburndale, MA (US); David Burghart, Bentonville, AR (US); Blake Jarrett, Toronto (CA); Adam P. Stevens, Salem, MA (US)

(73) Assignee: McCue Corporation, Salem, MA (US)

( * ) Notice: Subject to any disclaimer, the term of this patent is extended or adjusted under 35 U.S.C. 154(b) by 0 days.

(21) Appl. No.: 10/081,977

(22) Filed: Feb. 20, 2002

(65) Prior Publication Data

US 2002/0117820 A1 Aug. 29, 2002

Related U.S. Application Data

(60) Provisional application No. 60/271,029, filed on Feb. 23, 2001.

(51) Int. Cl.[7] .............................. B62B 1/00; B62B 7/00; B62D 39/00; A63G 9/10
(52) U.S. Cl. .............. 280/79.2; 280/47.38; 280/33.993; D34/19; 297/181
(58) Field of Search ........................... 280/47.34, 47.35, 280/47.38, 33.993, 827, 1.13, 79.2; D34/19, 20; D21/534, 535; 446/78, 110, 88, 93, 94, 95, 279, 269, 476, 482; 297/181

(56) References Cited

U.S. PATENT DOCUMENTS

| | | | |
|---|---|---|---|
| 2,443,236 A | 6/1948 | Gallagher | 280/50 |
| 2,861,626 A * | 11/1958 | Mills, Jr. | 297/488 |
| 4,089,543 A | 5/1978 | Osborne | 280/647 |
| 4,537,413 A | 8/1985 | Rehrig | 280/33.99 B |
| 4,805,935 A * | 2/1989 | Grayson | 280/33.992 |
| 5,263,726 A * | 11/1993 | Wood | 280/33.992 |
| 5,312,122 A | 5/1994 | Doty | 280/33.992 |
| 5,330,210 A * | 7/1994 | Lambrecht | 280/33.993 |
| 5,385,357 A * | 1/1995 | Trubiano | 280/33.993 |
| 5,409,263 A | 4/1995 | Klawitter | 280/827 |
| D388,027 S | 12/1997 | Polak et al. | D12/129 |
| 5,823,548 A * | 10/1998 | Reiland et al. | 280/33.993 |
| 5,848,797 A | 12/1998 | Paez | 280/33.993 |
| D405,846 S | 2/1999 | Walter | D21/433 |
| 5,882,021 A | 3/1999 | Reiland et al. | 280/33.993 |
| 5,918,891 A * | 7/1999 | Russell | 280/33.991 |
| 6,022,031 A | 2/2000 | Reiland et al. | 280/33.993 |
| 6,270,093 B1 * | 8/2001 | Johnson et al. | 280/33.993 |
| 6,299,207 B1 * | 10/2001 | Bares | 280/748 |

FOREIGN PATENT DOCUMENTS

| | | |
|---|---|---|
| DE | 42 03 330 A1 | 8/1983 |
| DE | 43 37 917 A1 | 5/1994 |

* cited by examiner

Primary Examiner—Brian L. Johnson
Assistant Examiner—G B Klebe
(74) Attorney, Agent, or Firm—Lahive & Cockfield, LLP

(57) ABSTRACT

A shopping cart suitable for storage and conveyance of a conventional capacity of food or other products while also transporting and entertaining at least one child. The shopping cart has at least one storage basket, as well as a body integrally mounted below and forward of the basket. The body simulates a vehicle to provide a relatively easier shopping experience for the guardian and a more enjoyable shopping experience for the child. Additional features include the use of a swing arm to improve passenger safety, and bumpers to protect the cart and body from collision and abrasion.

34 Claims, 4 Drawing Sheets

SHOPPING CART HAVING A CHILD SUPPORTING APPARATUS

RELATED APPLICATION

This application claims priority to co-pending U.S. Provisional Application 60/271,029, filed Feb. 23, 2001, for all subject matter common to both applications. The disclosure of said provisional application is hereby incorporated by reference in its entirety.

FIELD OF THE INVENTION

The invention relates to an improved shopping cart suitable for storage and conveyance of a conventional capacity of food or other products, while also transporting and entertaining at least one child.

BACKGROUND OF THE INVENTION

Carts, such as shopping carts, for storing and/or conveying or transporting groceries or other products are known. The carts range in size from smaller, more portable, luggage rollers to larger capacity shopping carts or platforms suitable for more voluminous objects.

These known carts often have any one of a number of different child seating structures attached thereto, so that an individual can provide a place for a child to sit while the individual utilizes the cart to, e.g., shop in a store. Conventional carts often have a collapsible child seat near a handle of the cart, suitable for only a single child.

In some circumstances it is desirable to have a seat available for each of two children. One known cart that addresses this concern is depicted in three U.S. patents to Reiland, et al., U.S. Pat. No. 5,823,548, U.S. Pat. No. 5,882,021, and U.S. Pat. No. 6,022,031. In these U.S. patents, the "child carrier" includes a platform supported by at least one caster, two seat areas, and a restraining device for each seat, such as a seat belt, to hold the child in place. The carrier is rigidly attached to the rear portion of the cart, and the child or children have some access to items placed in the upper compartment of the cart. The extension of the carrier from the rear portion of the cart creates a longer wheelbase than a typical shopping cart.

Another known solution is depicted in U.S. Pat. No. 5,330,210 to Lambrecht. This patent depicts a cart with a removable shell disposed on a lower of two frame portions. The shell includes a seat for locating a child directly below the upper basket of the cart. The shell rests on the lower frame, which would otherwise be useable space for transporting items in the cart.

SUMMARY OF THE INVENTION

There exists in the art a need for a cart having storage capacity substantially equivalent to a standard shopping cart, while also providing additional structure for transporting and entertaining one or more children, wherein the structure is fully integrated into the cart. The present invention is directed toward further solutions in this art.

In accordance with one example embodiment of the present invention, a shopping cart has a frame. A basket mounts on the frame. A vehicle resembling body integrally mounts with the frame. The body has seating for two children, at least one steering wheel. At least one mirror, and/or mirror housing, can mount to a side of the body. Decorative wheels that do not contact the ground and a storage bed for storing items can also be included in example embodiments. There is at least one caster wheel disposed at distal corners of the frame for supporting the cart and any contents of the cart while enabling a user to roll the cart over a surface, such as a store floor. Six wheels can support the cart and the body, each wheel being a caster swivel wheel or a fixed wheel.

The shopping cart, in accordance with one aspect of the present invention, has a roof over the body. The body of the cart can further include one or two swing arms on either side of the body. The swing arms pivot up or down to an open or closed position. When in a closed position, the arms help to keep children passengers inside the body. Motion limiters can prevent the arms from opening beyond the open position. In addition, the mirror housings can support the arms in the closed position.

The shopping cart, in accordance with another aspect of the present invention has a mesh floor extending below the frame. The mesh floor allows objects or liquids dropped or spilled by child passengers to pass through to a surface below the cart. In addition, the mesh floor helps to maintain the legs and feet of child passengers inside the body for better safety.

The shopping cart, in accordance with still another aspect, includes a back wall on the body, which hinders access by the child passengers from an interior portion of the body to the storage bed.

The shopping cart, in accordance with further aspects of the present invention can have one or more of a small article basket disposed above the body for added storage capacity. Further, an infant seat can be disposed within the basket for added seating capacity, and at least one restraining element can be placed in the body for restraining child passengers.

The shopping cart, in accordance with yet another aspect of the present invention, has a body in a shape similar to one of an automobile, a sled, a train, an aircraft, a spacecraft, and a ship, in addition to other known forms of conveyance, for entertaining the child passengers.

The shopping cart can be provided with one or more bumpers at strategic locations to provided resistance to damage in the instance of collision with surrounding objects. The bumpers further protect the cart and body from abrasion and therefore extend the life of the shopping cart.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION OF THE INVENTION

Figure 1:
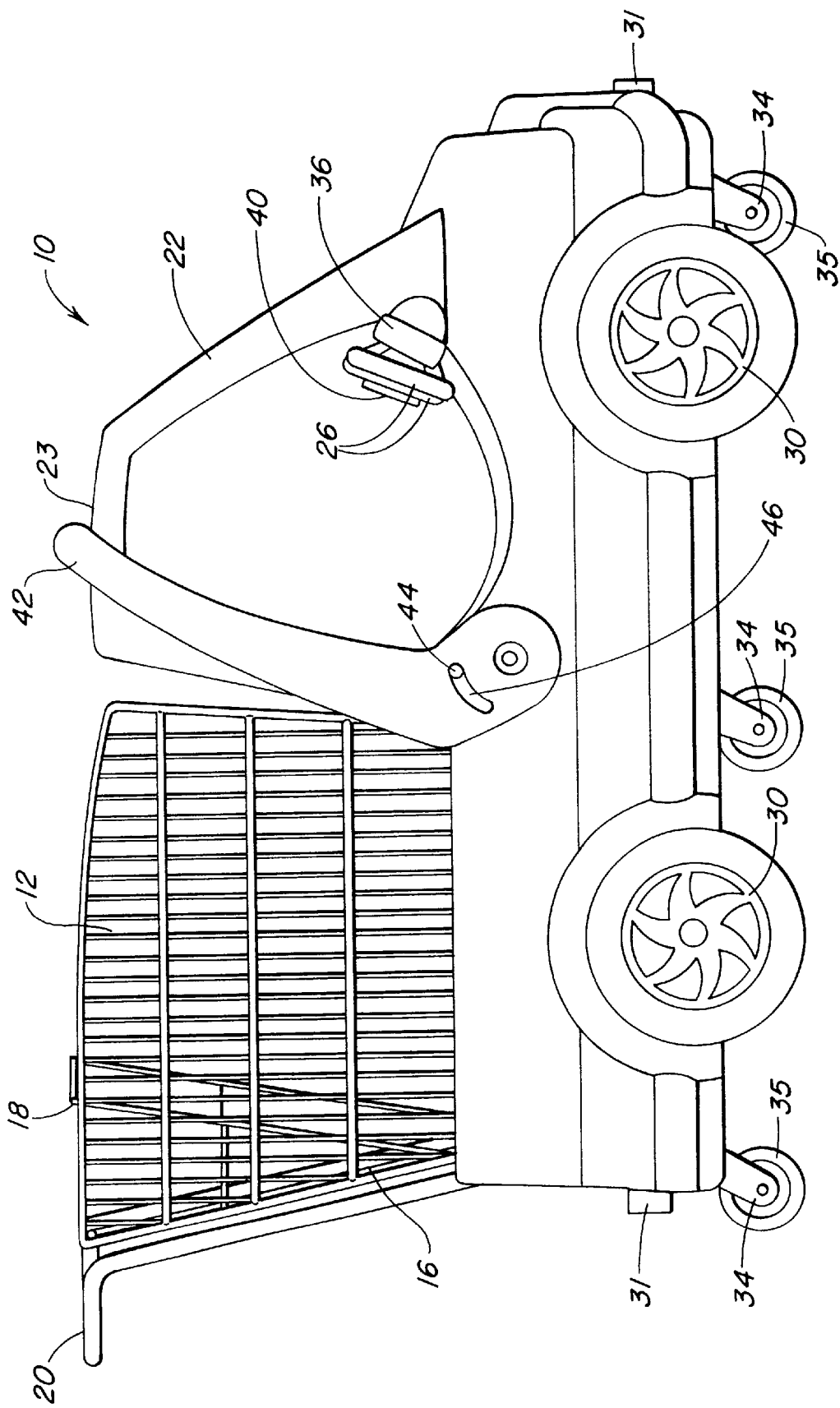
FIG. 1 is a diagrammatic side view illustration of a cart according to one embodiment of the present invention.

The present invention generally relates to a cart for shopping. The cart is suitable for storage and conveyance of a conventional capacity of food or other products while also transporting and entertaining at least one child. The cart has an upper basket area mounted to a lower frame that supports one or more casters or wheels. The upper basket is disposed above and behind a body containing two seats suitable for child-sized individuals. The body can further include a roof, a back wall, a rear bed for additional cart storage capacity, and additional accessories such as a steering wheel and at least one rear view mirror and/or mirror housing. The body is intended to resemble a vehicle, which offers entertainment value and thereby enhances the child passengers' experience.

The arrangement of the body, forward of the basket and proximal to the ground upon which the cart rests, provides for a significantly lower center of gravity for the passengers within the body. The lower center of gravity hinders accidental tipping of the cart. In addition, the roof and the back wall of the body hinder the passenger children of the body from accessing any of the items stored in the cart, thus denying unwanted tampering with the items. The body can also include body wheels that do not make contact with the surface below the cart, and do not serve as active wheels enabling the cart to roll. The body wheels can, however, provide added anti-tipping support should the cart begin to tip sideways. In addition, the body can include a swing arm on either side across a door portion of the body. The swing arm rotates into a closed position to hinder child passengers from leaving the cart unexpectedly, and further enhances the safety of the child passengers by providing added protection in case of collision or falling items.

FIGS. 1 through 6, wherein like parts are designated by like reference numerals throughout, illustrate an example embodiment of a cart according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

FIG. 1 illustrates a perspective view of a cart 10, according to one embodiment of the present invention. The cart 10 has a main basket 12 of typical size for a shopping cart (e.g., 10,000 cubic inches). The main basket 12 can include a swing back panel 16, to aid in the nesting of the baskets 12 during shipping or storage. The swing back panel 16 raises when a second basket 12 is pushed into the swing back panel 16, thus compressing the two baskets 12 into an area less than the sum of each basket's 12 individual length. The arrangement can be modified to allow for the stacking of entire carts 10 as well, utilizing the swing back panel 16 feature.

There is also an optional infant seat 18 integral with the main basket 12. The infant seat 18 folds away when not in use, and unfolds to provide a seat 18 suitable for an infant or small child. A restraining device, such as a seat belt, can be included to hold the infant in place.

A handle 20 extends from a back end of the cart 10 for an individual to push and maneuver the cart 10 as desired. The size and shape of the cart 10 enables an individual user to experience handling characteristics similar to a standard shopping cart.

Figure 2:
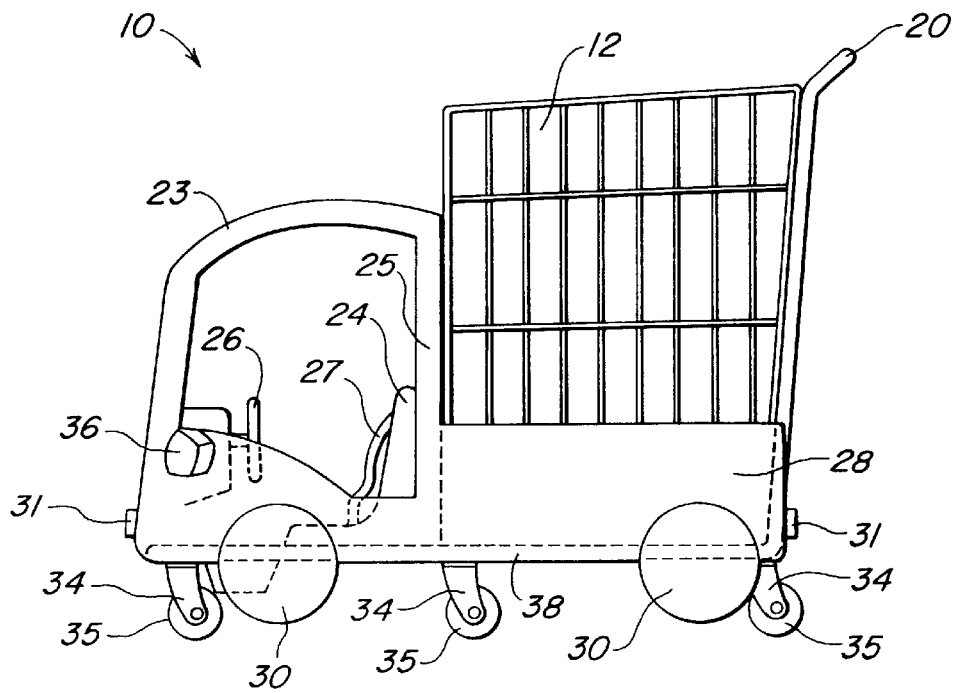
FIG. 2 is a diagrammatic illustration of the cart according showing additional features in accordance with another aspect of the present invention.
Figure 3:
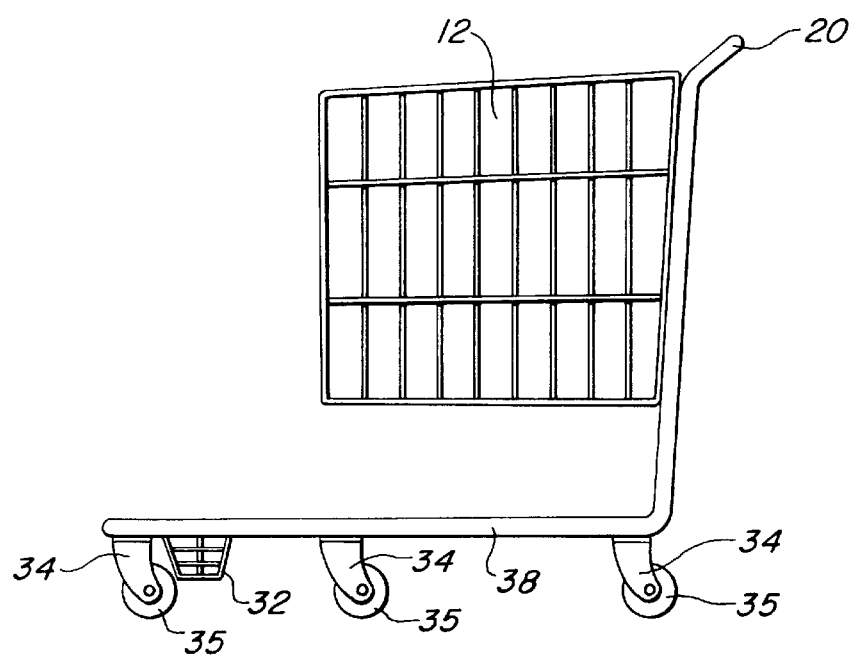
FIG. 3 is still another diagrammatic illustration of the cart.

The cart 10 rolls on at least one caster 34 (see also FIGS. 2 and 3). The cart 10 illustrated has six casters 34 with wheels 35, one at each distal corner of a frame 38 integral with the basket 12, and a pair in the central portion. However, there can be a different number of casters 34 and wheels 35, as long as the cart is suitably supported by the casters 34 and wheels 35 in a manner that permits an individual to push and maneuver the cart 10 as desired. The casters 34 can be stationary, allowing only the wheels 35 to rotate, or the casters 34 can pivot about an axis substantially perpendicular to a pivot axis of the wheels 35 to enable the cart 10 to more easily turn and maneuver. Each caster wheel 35 is of a non-marking variety, thus significantly preventing the wheels 35 from leaving scuffs or other marks on any surface upon which carts 10 are typically utilized.

In the illustrated embodiment, a vehicle resembling body 22 is disposed underneath and forward of the basket 12. The body 22 includes a seat 24 shaped and sized to enable two children to sit comfortably within the body 22. There are also two steering wheels 26 on a dashboard section internal to the body 22. The steering wheels 26 can rotate as desired, but do not control the steering of the cart 10. There can be one steering wheel 26 for each of the two child passengers, or only one steering wheel 26 to more accurately resemble a real transportation vehicle. The steering wheels 26 can further serve to mount an entertainment console 40. The console 40 can take the form of a mounting bracket for different electronic game devices, or can actually provide the electronic game devices. The console 40 can mount on the steering wheel 26, or on another location in a dashboard area of the body 22 that is accessible by the child passengers.

The body 22 has a roof 23, which serves to make the body 22 look more like a transportation vehicle. The roof 23 also serves to protect the child passengers from items accidentally dropped from above, or falling out of the basket 12. A bumper 31 can be provided at peripheral edges of the body 22 to protect the body 22 and cart 10 from damage in case of impact with surrounding objects. In addition, the bumper 31 can serve to protect the body 22 and the cart 10 from abrasion, further extending the life of the body 22 and the cart 10. The bumper 31 can be removable and/or replaceable if desired.

The body 22 further includes a body bed 28 disposed behind the body 22, and underneath the main basket 12. The bed 28, acts in a manner similar to a pick-up truck bed, and provides additional storage capacity for an individual to place items for conveyance in the cart 12. A back wall 25 in the body 22 hinders the child passengers of the body 22 from accessing the items placed in the body bed 28. The back wall 25 can be solid, or can include a window opening 29. In embodiments having a window opening 29, the position of the body 22 relative to the basket 12 is such that the front side of the basket 12, reachable by the child passengers, still prevents the child passengers from reaching into the basket 12.

There are wheels 30 at distal corners of the body 22. The wheels 30 do not contact the ground upon which the cart 10 rests in normal operation and do not continually support the weight of the body 22, the basket 12, the frame 38, the items within the cart 10, or the child passengers. The casters 34 and wheels 35 mounted to the frame 38 support the full weight of the body 22 and its contents under normal circumstances. The wheels 30 of the body 22 are decorative and aesthetically combine with the look of the body 22 to make it appear more like a vehicle. The body wheels 30 can be integral with the body of the body 22, or can be separate elements, fixed or rotatably mounted on the body 22 or the frame 38. The body wheels 30 can also serve to hinder tipping of the cart 10, in that if the cart 10 begins to tip sideways, the wheels 30 come into contact with the floor or ground and provide a stabilizing force and structure, hindering further tipping.

Figure 4:
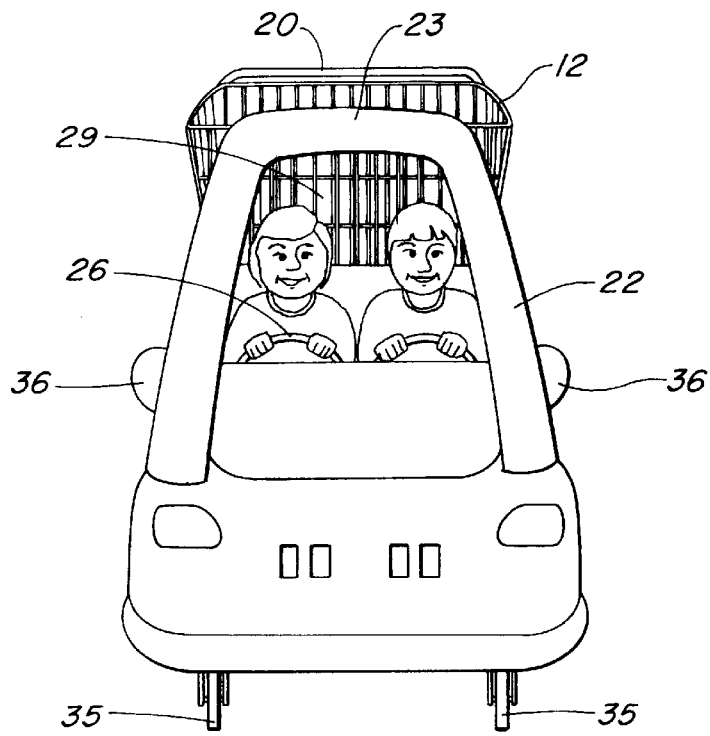
FIG. 4 is a diagrammatic front view of the cart according to still another aspect of the present invention.
Figure 5:
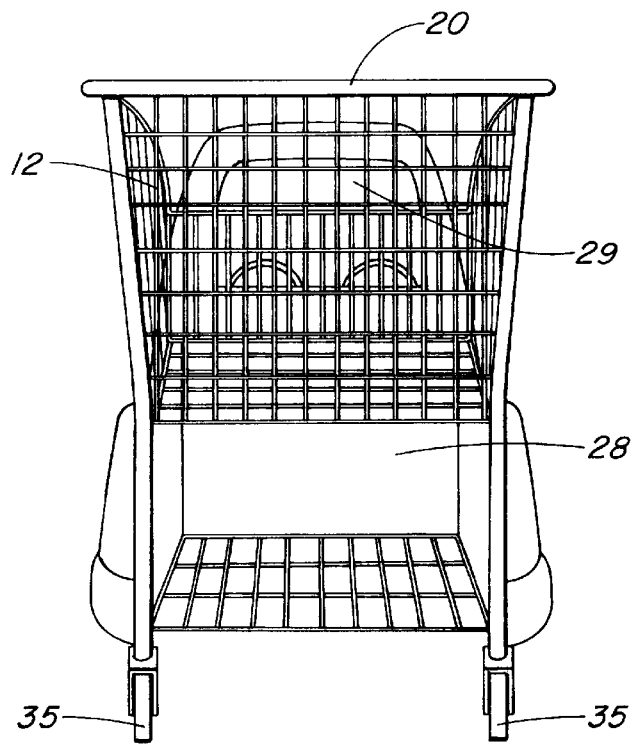
FIG. 5 is a diagrammatic rear view of the cart according to still another aspect of the present invention.

The body 22 illustrated in FIGS. 1, 4, and 5 further includes at least one mirror housing 36 disposed on each side of the body 22. The mirror housing 36 can include a reflective mirror surface, if desired. The angle of the mirror surface can be positioned to enable an individual pushing and maneuvering the cart 10 utilizing the handle 20 to see inside the body 22. This provides guardians of the child passengers with added comfort in being able to see what the child passengers are doing in the body 22. The mirror housing 36 makes the body 22 appear more authentic in embodiments such as an automobile.

The body mounts with the basket 12 and the frame 38 of to form the cart 10 by use of standard fasteners, adhesive, welding, hook and fiber, or other attachment means as understood by one of ordinary skill in the art.

FIGS. 2 and 3 are diagrammatic side views of the cart 10 with the body 22, and without the body 22, respectively. There is a mesh floor 32 extending below the frame 38, to provide added foot space for the child passengers. The mesh floor 32 allows items or liquids to be dropped through the mesh to the surface below, thus reducing the likelihood of dirt or spilled liquid buildup. In addition, the mesh floor 32 provides a safer environment for the child passengers by keeping their feet inside the body 22 and away from the floor/ground and wheels.

FIG. 2 illustrates the bed 28 of the body 22, which has an open end at the back of the cart 10 that extends to the back wall 25 of the body 22. The open end allows an individual to place additional items for storage and conveyance into the bed 28 area, which provides an additional approximately 5,000 cubic inch space. FIG. 3 illustrates the underlying frame 38 structure of the cart 10 with the body 22 removed. The frame 38 extends from the handle 20 down to the casters 34 and supports the casters 34 along with the entire weight of the cart 10 and its contents.

FIGS. 4 and 5 further illustrate that the filly integrated custom molded body 22 and custom basket 12 results in a fully integrated unit. There is seating for two child passengers within in the molded body 22 body. There can be two steering wheels, one for each child passenger, which adds to the entertainment value of the cart 10 to the child passengers. The non-marking casters 34 and wheels 35 allow for maneuverability and familiarity with handling of standard shopping carts. The large capacity basket 12 allows the individual or shopper to fit an amount of groceries or other items sufficient for a family. The integrated infant seat 18 (see FIG. 1) enables three children to ride in the cart 10, while still maintaining the large capacity of a standard shopping cart, including the space for large bulk items underneath the basket 12 in the bed 28. The decorative wheels 30 make the body 22 look more realistic, but do not encourage theft for the "toy" aspect of the cart 10 because the wheels 30 are not designed to support the body 22, and they are not linked to the steering wheel 26. In addition, the body 22 is integral with the frame 38, thus hindering any removal attempt. The body 22 is not designed to operate as a vehicle separate from the cart 10. Seat belts 27 can be provided for added safety. The overall length is only 20% greater than existing standard shopping carts with comparable capacity, thus the handling characteristics of the cart 10 are substantially similar to standard shopping carts. The similar handling characteristics reduce the likelihood of unwanted collisions, and do not unduly strain the individual by requiring excessive forces to maneuver the cart 10. The overall length can, however, vary as understood by one of ordinary skill in the art to provide for larger or smaller carts.

Figure 6:
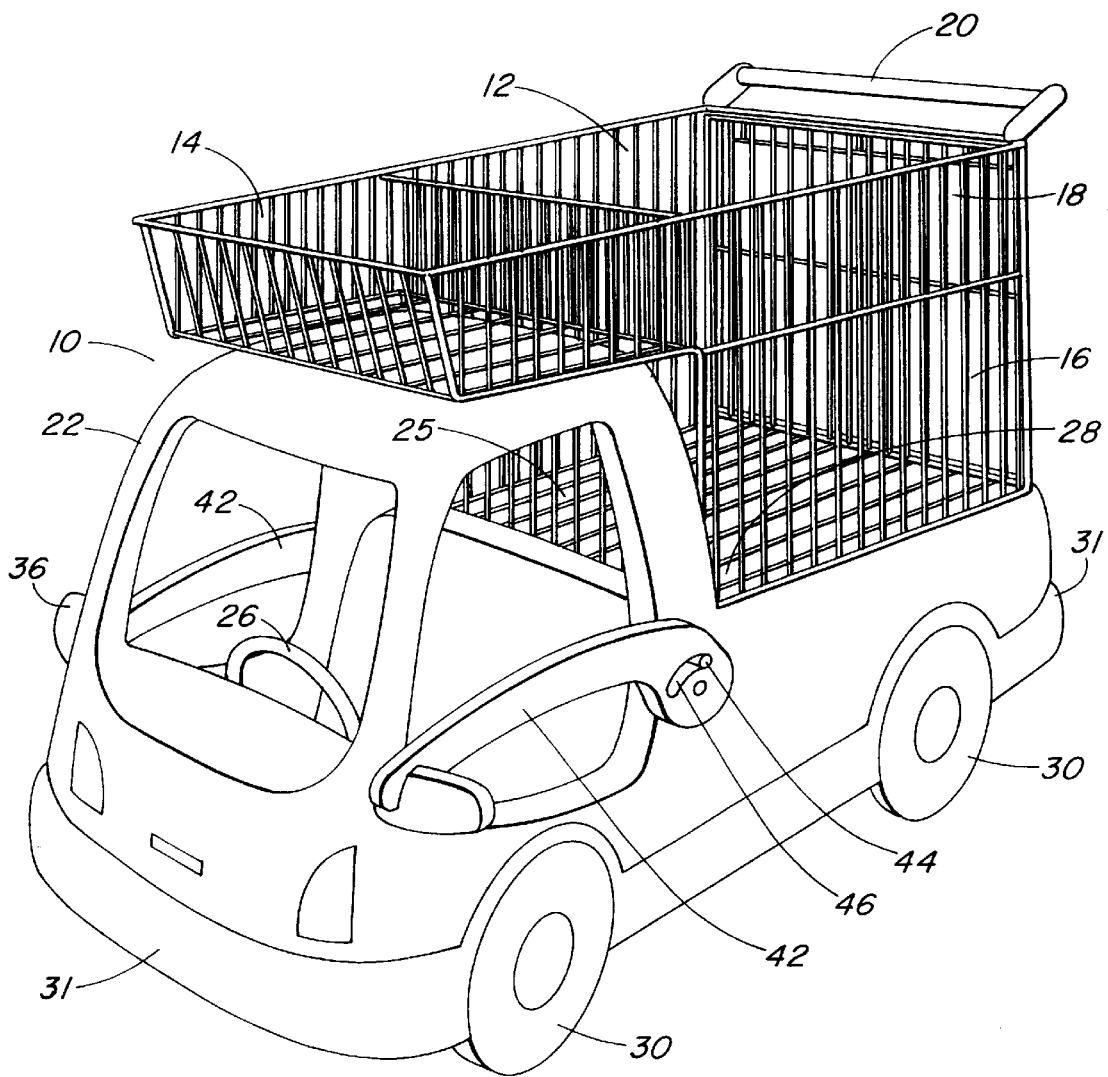
FIG. 6 is a perspective illustration of a cart according to another embodiment of the present invention.

FIG. 6 illustrates a perspective view of the cart 10, according to one embodiment of the present invention that includes a small article basket 14. The cart 10 has the main basket 12 of typical size and additionally includes the small article basket 14 extending from the main basket 12. The small article basket 14 is optional, but provides an extra capacity for those individuals shopping for a significant quantity of items at any one time. Alternatively, the small article basked 14 can be used to separate items, or otherwise protect crushable items from other items placed in the cart. The small article basket 14 can be integral with the main basket 12, or can alternatively be a separate basket, removably mounted or fastened to the main basket 12 with fasteners, such as clips or hooks. In addition, one of ordinary skill in the art will appreciate that the main basket 12 can mount to the frame 38 and/or can mount to the body 22.

The embodiment illustrated further includes two arms 42 pivotally attached on either side of the body 22. Each arm 42 pivots, allowing the arm 42 to rotate upward to an open position or rotate downward to a closed position, where they interfere with movement into or out of the body 22. There is a motion limiting device, such as a peg 44, provided to limit the rotation of the arms 42 beyond a substantially vertical position (which is the open position in this embodiment). In the illustrated embodiment, the peg 44 operates within a curved slot 46 formed within the arms 42. However, the peg 44 can be placed in other locations to hinder rotation of the arms 42 as would be understood by one of ordinary skill in the art. The peg 44 can include a flanged end to hinder the arms 42 from being pulled out (or pushed out by the child passengers) and away from the body 22 as well. As the arms 42 approach vertical, or the open position, the peg 44 blocks further motion to prevent over rotation of the arms 42. The mirror housings 36 can further provide a location for the arms 42 to come to rest in the closed position, and also hinder over-rotation.

The arms 42 aid in keeping the child passengers inside the body 22 of the cart 10 by making it more difficult to exit the body 22. The arms 42 also provide added protection for the child passengers from other carts that could collide with the body 22, or other objects the cart 10 could accidentally collide with during operation, thus providing added safety. One of ordinary skill in the art will appreciate that the arms 42 can take many other forms, while still accomplishing the identified functions. For example, the arms 42 can swing from other locations on the body, can pivot outward like a door, can be completely removed and snapped or otherwise fastened into place, and the like. In addition, the arms 42 can be made to latch in a manner such that a guardian or supervisor for the child passengers can lock or unlock the arms 42, but the child passengers are unable to lock or unlock the arms 42. Further, the arms 42 can have different limiting features that prevent the arms 42 from moving beyond predetermined limits.

A number of different materials can form the basket 12, small article basket 14, frame 38, swing back panel 16, infant seat 18, and handle 20, including various metals, plastics, and/or composites, suitable for supporting the weight of the items placed within, and the child passengers. The basket 12, frame 38, small article basket 14, swing back panel 16, infant seat 18, and handle 20 can all be of a number of different structures including tubular, wire, beam, and the like, with cross-sections of, e.g., circular shape.

The body 22 of the cart 10 can be any number of different transportation vehicle shapes, such as automobile, sled, truck, bus, train, aircraft, spacecraft, ship, and the like, to add to the entertainment of the child passengers and increase their desire to ride in the body 22.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and the applicable rules of law.

What is claimed is:

1. A shopping cart, comprising:
    a frame;
    a storage basket mounted on said frame;
    a body integral with said frame and disposed forward of and underneath said basket, said body being sized and dimensioned to accommodate at least two children, shaped to resemble a transportation vehicle, and disposed to create a barrier that hinders said children from accessing said basket;
    a plurality of wheels disposed on said frame for supporting said shopping cart; and
    an arm disposed on each of a plurality of door entries to the body and positionable into a closed position to block entry to or exit from the body and an open position to allow entry to or exit from the body.

2. The shopping cart according to claim 1, wherein said body comprises an enclosure having a roof suitable for protecting said children from failing objects.

3. The shopping cart according to claim 1, further comprising a mesh floor disposed below said frame.

4. The shopping cart according to claim 1, further comprising a storage bed disposed behind said body and below said basket suitable for additional storage of items.

5. The shopping cart according to claim 1, wherein said barrier comprises a back wall that hinders access from an interior portion of said body to said storage basket.

6. The shopping cart according to claim 1, wherein said barrier comprises a front wall of said basket that hinders access from an interior portion of said body to said storage basket.

7. The shopping cart according to claim 1, further comprising a small article basket disposed above said body.

8. The shopping cart according to claim 1, further comprising an infant seat disposed in said storage basket for seating an infant or small child.

9. The shopping cart according to claim 8, further comprising at least one restraining element in said infant seat for restraining an infant.

10. The shopping cart according to claim 1, further comprising at least one restraining element in said body for restraining said children within said body.

11. The shopping cart according to claim 1, further comprising at least one mirror housing disposed on a side of said body.

12. The shopping cart according to claim 11, wherein the at least one mirror housing serves to support the arm while in the closed position.

13. The shopping cart according to claim 1, wherein said body is made of molded plastic.

14. The shopping cart according to claim 1, wherein said transportation vehicle shape is in a shape resembling an automobile.

15. The shopping cart according to claim 1, further comprising at least one bumper to protect the body in case of at least one of collision and abrasion.

16. The shopping cart according to claim 1, wherein said plurality of wheels comprises between 4 and 6 wheels.

17. The shopping cart according to claim 16, wherein at least 2 wheels comprise swivel caster wheels and at least one non-swivel wheel mounts in a middle portion of said shopping cart.

18. The shopping cart according to claim 1, further comprising at least one body wheel disposed on said body, said at least one body wheel being sized and dimensioned to contact said ground surface only upon tilting of said shopping cart to hinder tipping over of said shopping cart.

19. The shopping cart according to claim 1, further comprising a motion limiter for limiting the arm from movement beyond at least one of the open and closed positions.

20. The shopping cart according to claim 1, further comprising at least one steering wheel disposed within the body.

21. A shopping cart, comprising:
    a frame;
    a basket mounted on said frame;
    a body mounted on said frame, said body comprising seating for at least two children, at least one steering wheel, at least one mirror housing mounted to a side of said body, body wheels suitable for hindering unwanted tilting of said shopping cart that do not contact the ground when the cart is not tilted, and a storage bed for storing items; and
    at least one caster wheel disposed on said frame for supporting said cart and a contents of said cart while enabling a user to roll said cart over a surface.

22. The shopping cart according to claim 21, wherein said body comprises an enclosure having a roof suitable for protecting said children from falling objects.

23. The shopping cart according to claim 21, further comprising a mesh floor extending below said frame.

24. The shopping cart according to claim 21, further comprising a barrier in the form of one of a back wall that hinders access from an interior portion of said body to said storage basket, and a front wall of said basket that hinders access from an interior portion of said body to said storage basket.

25. The shopping cart according to claim 21, further comprising a small article basket disposed above said body.

26. The shopping cart according to claim 21, further comprising an infant seat disposed within said basket.

27. The shopping cart according to claim 21, wherein said at least one mirror enables a said user to see inside said body while in a location suitable for pushing and maneuvering said cart.

28. The shopping cart according to claim 21, wherein said body is in a shape resembling an automobile.

29. The shopping cart according to claim 21, further comprising at least one bumper to protect the body in case of at least one of collision and abrasion.

30. The shopping cart according to claim 21, wherein said at least one caster wheel comprises between 4 and 6 caster wheels.

31. The shopping cart according to claim 30, wherein at least 2 caster wheels comprise swivel caster wheels and at least one non-swivel caster wheel mounts in a middle portion of said shopping cart.

32. The shopping cart according to claim 21, further comprising a pivotably mounted arm disposed on each of a plurality of door entries to the body and rotatable into a down position to block entry to or exit from the body and up position to allow entry to or exit from the body.

33. The shopping cart according to claim 32, wherein the at least one mirror housing serves to support the arm while in the closed position.

34. The shopping cart according to claim 32, farther comprising a motion limiter for limiting the arm from movement beyond at least one of the up and down positions.

* * * * *